United States Patent
Family

(10) Patent No.: US 12,377,959 B2
(45) Date of Patent: Aug. 5, 2025

(54) AIRCRAFT WING TRAILING EDGE DEVICE

(71) Applicant: AIRBUS OPERATIONS LIMITED, Bristol (GB)

(72) Inventor: Oliver Family, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 13 days.

(21) Appl. No.: 18/352,033

(22) Filed: Jul. 13, 2023

(65) Prior Publication Data

US 2024/0017818 A1   Jan. 18, 2024

(30) Foreign Application Priority Data

Jul. 14, 2022 (GB) .................................... 2210375

(51) Int. Cl.
*B64C 9/18* (2006.01)
(52) U.S. Cl.
CPC ..................................... *B64C 9/18* (2013.01)
(58) Field of Classification Search
CPC .... B64C 9/06; B64C 9/08; B64C 9/12; B64C 9/16; B64C 9/18; B64C 3/42
See application file for complete search history.

(56) References Cited

U.S. PATENT DOCUMENTS

| | | | |
|---|---|---|---|
| 2,137,879 A | 11/1938 | Joseph | |
| 2,661,166 A * | 12/1953 | Gordon | B64C 9/20 244/216 |
| 3,583,660 A * | 6/1971 | Hurkamp | B64C 21/04 244/212 |
| 3,614,028 A * | 10/1971 | Kleckner | B64C 9/20 244/54 |
| 3,767,140 A | 10/1973 | Johnson | |
| 4,641,800 A | 2/1987 | Rutan | |
| 4,995,575 A | 2/1991 | Stephenson | |

(Continued)

FOREIGN PATENT DOCUMENTS

| | | |
|---|---|---|
| CA | 432 339 A | 1/1946 |
| EP | 3498595 A1 | 6/2019 |

(Continued)

OTHER PUBLICATIONS

Extended European Search Report for Application No. EP23185127.0, nine pages, dated Nov. 29, 2023.

(Continued)

*Primary Examiner* — Richard G Davis
(74) *Attorney, Agent, or Firm* — Nixon & Vanderhye P.C.

(57) ABSTRACT

An aircraft wing is disclosed having a trailing edge system including a pivotable spoiler and a moveable flap. The flap has a pivotable trailing edge device, which is for example able to rotate independently of the flap by up to +/−20 degrees. The flap is translatable and rotatable relative to the wing independently of the movement of the spoiler. The trailing edge system is configured to adopt one of several different configurations or modes of operation facilitating all of camber and/or wing chord change during cruise, high speed and low speed roll control mode, enhanced high lift, and load alleviation. As such, the wing may not need any separate ailerons or other trailing edge control surfaces, and may also offer improved aerodynamics, reduced drag and other efficiency improving benefits.

14 Claims, 6 Drawing Sheets

(56) References Cited

U.S. PATENT DOCUMENTS

| | | | |
|---|---|---|---|
| 5,551,651 A | 9/1996 | Hendrickson | |
| 2005/0230565 A1* | 10/2005 | Kallinen | B64C 23/06 |
| | | | 244/217 |
| 2009/0001225 A1 | 1/2009 | Libby | |
| 2011/0101174 A1 | 5/2011 | Voss et al. | |
| 2015/0083853 A1* | 3/2015 | Moser | B64C 9/16 |
| | | | 244/99.3 |
| 2019/0176962 A1 | 6/2019 | Kordel et al. | |

FOREIGN PATENT DOCUMENTS

| | | |
|---|---|---|
| GB | 595299 A | 12/1947 |
| GB | 1368347 A | 9/1974 |
| GB | 1602905 A | 11/1981 |
| WO | 0146008 A1 | 6/2001 |

OTHER PUBLICATIONS

Combined Search and Examination Report for GB2210375.8, dated Jan. 17, 2023, 3 pages.
Search Report for GB2210375.8, dated May 9, 2023, 3 pages.
Getty Images, 2023, "Trailing-edge wing flaps and wing of a Titan Airways Boeing 737-300 flying near the coast", accessed Dec. 1, 2023, 2 pages, available from: <https://www.gettyimages.ca/detail/news-photo/trailing-edge-wing-flaps-and-wing-of-a-titan-airways-boeing-news-photo/973329336>.
Flickriver, 2023, "Lufthansa A321 wing", accessed Dec. 1, 2023, 2 pages, available at:<https://www.flickriver.com/photos/75061930@N00/4705829110/Flickriver>.
Rosario Pecora, "Morphing wing flaps for large civil aircraft: Evolution of a smart technology across the Clean Sky program", Chinese Journal of Aeronautics, vol. 34, No. 7, 2021, pp. 13-28, available at:<https://doi.org/10.1016/j.cja.2020.08.004>.

* cited by examiner

AIRCRAFT WING TRAILING EDGE DEVICE

CROSS RELATED APPLICATION

This application claims priority to United Kingdom Patent Application GB 2210375.8, filed Jul. 14, 2022, the entire contents of which is hereby incorporated by reference.

BACKGROUND OF THE INVENTION

The present disclosure relates to improvements in aircraft wing design.

The present invention concerns a trailing edge system for an aircraft wing. More particularly, but not exclusively, this invention concerns a trailing edge system for an aircraft wing, an aircraft wing comprising such a trailing edge system, a method of operating an aircraft having a trailing edge device.

A wing of a modern commercial aircraft typically comprises a collection of moveable control surfaces for adapting the shape of the wing. Such control surfaces comprise spoilers or airbrakes, leading edge slats, trailing edge flaps, ailerons, and sometimes moveable wing tip devices. Each control surface may be designed with a particular purpose, or purposes in mind. Actuators and other structure are provided to facilitate movement of the control surface in line with preferred kinematics. Such control surfaces are being continually refined and improved, as manufactures look to improve the efficiency of aircraft operation. There are many proposals in the prior art for adaptions to wing design in an attempt to make efficiency gains. An acknowledgement of examples of the prior art now follows.

The Airbus A321 aircraft has retracting flaps which incorporate moveable tabs at their trailing edge. The movement of the flap causes movement of the tab as a result of a linkage mechanism, so that the movement of tab is wholly dependent on the movement of the flap.

The Boeing 787 aircraft has a trailing edge device called a "flaperon" which is positioned between the ailerons and the flaps on the wing. The flaperons can be used to assist the ailerons on the aircraft to roll the aircraft when the pilot commands a change of bank angle of the aircraft, in which case the flaperons on the two wings move in opposing directions (e.g. elevated on the starboard side and lowered on the port side). The flaperons can also be used to assist the flaps on the aircraft, in which case the flaperons on the two wings move in the same direction (e.g. both lowered) to reduce stall speed.

An Airbus A350 of the prior art is shown schematically in FIG. 1. The aircraft 102 has two wings 104, one of which being shown in FIG. 2. The wing has flaps 106, spoilers 108 and an aileron 110 outboard of the flaps 106. The aircraft includes a system which enables the flaps to be partially deployed (by rotating them by a relatively small amount) during cruise, so as to modify the wing camber, very slightly, to improve efficiency.

EP 3 498 595 discloses a trailing edge device called "a cruise miniflap" in the form of an ancillary aerodynamic surface at the trailing edge of the wing which can be moved to increase the area and chordwise dimensions of the wing.

US 2011/101174 discloses a high lift system for an aircraft wing comprising a main wing and a moveable flap configured to occupy a variety of extended positions.

U.S. Pat. No. 5,551,651 relates to an aircraft wing comprising a trailing edge flap having a high lift configuration. In one example illustrated in U.S. Pat. No. 5,551,651 there is shown a double-hinged flap construction in which a fore flap portion is connected to an aft flap portion via a hinge mechanism.

GB 595,299 discloses a trailing edge control surface in the form of a flap to which there is connected a geared tab.

U.S. Pat. No. 4,995,575 discloses a further wing trailing edge flap system.

US2019/176962 discloses spoilers and droop panels deployed on a wing with a flap system that enables a trailing edge with a variable camber.

There have been proposals for morphing structures for wings, in which the wing shape can morph from one configuration to another. One such solution involves a series of articulated wing portions that extend from the leading edge of the wing to the trailing edge.

It will be seen that there are many varied solutions in the prior art for improving the aerodynamic performance of an aircraft wing for different flight modes. Many suffer from being overly complex, requiring complicated kinematics that require multiple actuators and control systems. Few proposals have attempted to approach the issue of wing design afresh, resulting in add complexity to already complicated systems. It is believed that there are further improvements that can be made to the aerodynamic performance of current wing technology.

The present invention seeks to mitigate one or more of the above-mentioned problems. Alternatively or additionally, the present invention seeks to provide an improved trailing edge system for an aircraft wing and/or an improved wing design for an aircraft.

SUMMARY OF THE INVENTION

The present invention provides, according to a first aspect of the invention, a trailing edge system for an aircraft wing. This aspect encompasses both the case where the trailing edge system is made and provided separately from the aircraft wing and the case where the trailing edge system is assembled with, and forms part of, the rest of the aircraft wing (which may itself be in a fully assembled or part-assembled state). The following description of this aspect assumes that the trailing edge system forms part of the wing. In the present patent specification the term wing may refer to a section only of the wing on one side of an aircraft or the other—for example a starboard wing or a port wing.

The trailing edge system comprises a first control surface moveable relative to the wing, which may be in the form of a spoiler pivotable relative to the wing. In use the spoiler is arranged to be deployed to assist with lift dumping. The function of the spoiler could be provided instead by a droop panel. The trailing edge system further comprises a second control surface (in the form of a moveable flap) comprising a third control surface (in the form of a pivotable trailing edge device—e.g. tab or the like). The flap is moveable relative to the wing independently of movement of the first control surface relative to the wing. The pivotable trailing edge device is moveable independently of the flap.

It may be that the flap and the trailing edge device have a neutral position that corresponds to a normal cruise mode and that the flap can be raised or lowered from its neutral position and/or translated along a chordwise direction and the trailing edge device can also, independently of the position/movement of the flap, be raised or lowered from its neutral position. As such the control surfaces at the trailing edge of the wing can be used to provide a variety of different configurations that correspond to different modes of operation of the aircraft. This can be achieved with fewer actuators than might otherwise be needed on a conventional wing employing flaps, spoilers and ailerons.

In embodiments of this aspect of the invention, the first control surface (e.g. spoiler or droop panel), flap and trailing edge device are all moveable independently of each other. It will be appreciated that movement of the flap will—in typical embodiments—inevitably cause movement of the trailing edge device.

It is preferred for the first control surface (e.g. spoiler or droop panel), flap and trailing edge device to each be in the form of a rigid component, not having any morphing surfaces example. The first control surface, flap and trailing edge device may each have an upper skin and a lower skin, the skins being rigidly supported by an internal support structure, that may comprise one or more ribs or the like. The changing of the shape of the flap in operation may be achieved solely by the movement of the pivotable trailing edge relative to the rest of the flap. The flap comprising two independently moveable control surfaces (and preferably only two) may provide sufficient shape-changing capability for the flap in multiple modes of operation of the aircraft, while keeping the number of actuators and associated devices providing the kinematics relatively straightforward and low in number.

The moveable flap may be mounted for movement to adopt a normal cruise configuration (e.g. being for normal cruise mode of the aircraft) in which the flap provides an extension to the wing in the chordwise direction, and in which the pivotable trailing edge device provides an extension to the flap in the chordwise direction the wing having a first chordwise dimension as measured at a first spanwise location. In this normal cruise configuration the flap and the trailing edge device may adopt a neutral position that is between a raised position and a lowered position. In this normal cruise configuration, the first control surface may adopt a neutral position. It may be that in the normal cruise configuration the upper surface of the wing is formed in part by the first control surface (e.g. spoiler or droop panel), the flap and the trailing edge device, optionally with the majority (e.g. greater than 50%) of the upper surface of the flap forming at least part of the upper surface of the wing. It may be that, in the normal cruise, the upper wing surface extends from a fore end of the first control surface to an aft end, at which there is a junction with a fore end of the flap, the upper wing surface continuing to extend from that junction to an aft end of the flap, at which there is a junction with a fore end of the trailing edge device, the upper wing surface continuing to extend from that junction to an aft end of the trailing edge device.

The moveable flap may be mounted for movement to adopt a further cruise configuration, for example for wing chord reduction, in which the flap is positioned so that the wing has a second chordwise dimension as measured at the first spanwise location, the second chordwise dimension differing from (e.g. being shorter than) the first chordwise dimension. The difference between the first chordwise dimension and the second chordwise dimension may be greater than 10% of the median chord length of the flap as measured from the leading edge to trailing edge of the exposed upper surface of the flap when in the normal cruise configuration. The difference may be greater than 20%, possibly greater than a third, of this median chord length measurement. In this further cruise configuration, the fore end of the flap may be positioned beneath the aft end of the first control surface (e.g. spoiler or droop panel), so that the flap is (at least partially) stowed under the first control surface. The potential benefits of reducing the chord may be applicable also in other stages of flight, thus not only during cruise but also during climb and descent.

It may be that the wing has a lift dumping configuration. It may be that when in the lift dumping configuration, the flap is in a lowered position. It may be that when in the lift dumping configuration, the pivotable trailing edge device provides an extension to the flap in the chordwise direction. It may be that when in the lift dumping configuration, the first control surface (e.g. spoiler) is in an elevated position.

It may be that the wing has a high lift configuration. It may be that when in the high lift configuration, the flap is in a lowered position. It may be that when in the high lift configuration, a slotted gap is formed between the leading edge of the flap and the wing. It may be that when in the high lift configuration, the pivotable trailing edge device provides an extension to the flap in the chordwise direction. It may be that when in the high lift configuration, the first control surface is in a lowered position (e.g. lower than normal cruise mode).

It may be that the wing has an elevated configuration. It may be that when the wing is in the elevated configuration, the flap is in an elevated position as compared to its neutral position. It may be that when the wing is in the elevated configuration, the pivotable trailing edge device is moved relative to the flap so that the pivotable trailing edge device is in an elevated position as compared to the neutral position. It may be that when the wing is in the elevated configuration, the first control surface (e.g. spoiler or droop panel) is in an elevated position.

It may be that the wing has a lowered configuration. It may be that when the wing is in the lowered configuration, the flap is in a lowered configuration as compared to the neutral position. It may be that when the wing is in the lowered configuration, the pivotable trailing edge device is moved relative to the flap so that the pivotable trailing edge device is in a lowered configuration as compared to the neutral position. It may be that when the wing is in the lowered configuration, the first control surface is in a lowered configuration.

The pivotable trailing edge device may be mounted for pivoting movement of at least +/−15 degrees from the neutral position, more preferably at least at least +/−20 degrees from the neutral position, and possibly at least +/−25 degrees from the neutral position. It may be that the tab and its associated actuator are arranged to move the tab at a speed of at least 10 degrees/second, preferably at least 50 degrees per second, and may be capable of moving the tab at a speed of at least 80 degrees per second.

In embodiments, the moveable flap and the pivotable trailing edge device are mounted for pivoting movement together about a hinge mechanism. It will be appreciated that a hinge mechanism may also be provided to facilitate the pivoting movement of the trailing edge device relative to the flap. The moveable flap and the pivotable trailing edge device are also mounted for movement together between a position in which the flap is stowed, or at least partially stowed, and a position in which the flap is deployed. The movement of the flap between its stowed position and its deployed position may be primarily translational movement. For example, the moveable flap and the pivotable trailing edge device may be mounted for movement together along a track. The movement facilitated by the track may be straight line motion, which may simplify design and manufacture. The track may be curved, so that the movement facilitated by the track deviates from a straight line motion, which may result in more complicated kinematics being achieved, which optionally could remove the need for the flap to be provided with any separate actuator for rotating it relative to the wing, such motion being integrated into the kinematics provided by the track and associated actuator(s). It is preferred that the flap is both moveable by means of a translational movement and a rotational movement, and preferably independently of each other. The moveable flap and the pivotable trailing edge device may be mounted for movement together so as to form a slotted gap between the leading edge of the flap and the wing.

It is preferred that the first control surface (e.g. spoiler or droop panel), flap and trailing edge device extend along the majority, if not close to the entirety of, the trailing edge of the wing and for the flap and the trailing edge device (and preferably also the first control surface) to be substantially the same length (the length being measured along the spanwise direction). The moveable flap has a width w f in the chordwise direction and a length in the spanwise direction $l_f$, the pivotable trailing edge device has a width w t in the chordwise direction and a length $l_t$ in the spanwise direction, and the first control surface (e.g. spoiler) has a width $w_s$ in the chordwise direction and a length $l_s$ in the spanwise direction. As mentioned above the flap and/or the trailing edge device and/or the first control surface may have a similar length. It may be that $l_f$ is equal to $l_t$+/−10%. It may be that if is equal to $l_s$+/−10%. The flap and/or the trailing edge device and/or the first control surface may have a similar width. It may be that $w_f$ is equal to $w_t$+/−50%. It may be that $w_f$ is equal to $w_s$+/−50%. The width of the first control surface may be greater than the width of the flap ($w_s$>$w_f$). The width of the flap may be greater than the width of the trailing edge device ($w_f$>$w_t$). It may be that the flap and/or the trailing edge device and/or the first control surface (e.g. spoiler or droop panel) are elongate in shape. It may be that $l_f$>5×$w_f$, optionally >10×$w_f$. It may be that $l_s$>5×$w_s$, optionally>8×$w_s$. It may be that $l_t$>5×$w_t$, optionally>10×$w_t$. It may be that the width of one or more of the flap, trailing edge device and first control surface varies along its length. In such a case the median width should be used when measuring $w_s$, $w_f$ and $w_t$. It is preferred that the pivotable trailing edge has a lower effective contribution to the area of the wing than the flap or the first control surface (e.g. spoiler or droop panel). It may be that $w_f$>110% of $w_t$. It may be that $w_s$>110% of $w_f$ and/or that $w_s$>110% of $w_t$ (optionally $w_s$>120% of $w_t$, and possibly $w_s$>130% of $w_t$).

In embodiments of the invention, there may a wing construction in which the need for control surfaces other than those in accordance with the present invention is minimal. In such embodiments, it may be that the control surfaces provided on the trailing edge of the wing, with perhaps the exclusion of any wing tip devices that may or may not be provided, are all in accordance with the present invention. The aircraft wing may include one or more trailing edge systems according to the present invention, wherein each moveable flap of each trailing edge system has a length in the spanwise direction (i.e. measured in a direction along the root-to-tip direction, which may not necessarily be the same exact direction in which the length of the wing is measured along its trailing edge), the one or more flaps having a combined length that extends along the majority (e.g. greater than two thirds, and possibly greater than 80%] of the length of the wing along the trailing edge. In some cases the wing may comprise a wing tip device incorporating one or more control surfaces. In such a case, the length of the wing may be measured up to the root of the wing tip device (i.e. the wing tip device being discounted from the aforementioned length of the wing). Having moveable trailing edge device devices near the tip of the wing may remove the need for additional ailerons.

A further control surface may be provided to act as an airbrake. The first control surface (e.g. spoiler or droop panel) may also be configured to act as an airbrake.

It may be that the control surfaces provided by the trailing edge system(s) of the wing that are in accordance with the present invention represent >90% (or all or substantially all) of the area of the moveable control surfaces of the wing excluding any leading edge control surfaces and any moveable wing tip devices.

An embodiment of the invention concerns an aircraft wing comprising a trailing edge system, which optionally comprises a spoiler or droop panel mounted for pivotable movement relative to the wing, and also comprises a moveable flap comprising a pivotable trailing edge device, the wing having a first configuration being for normal cruise mode in which the flap provides an extension to the wing in the chordwise direction, and in which the pivotable trailing edge device provides an extension to the flap in the chordwise direction the wing having a first chordwise dimension as measured at a first spanwise location, the wing having a second configuration in which the flap is positioned so that the wing has a second chordwise dimension as measured at the first spanwise location, the second chordwise dimension differing from the first chordwise dimension.

There may be a control unit associated with the trailing edge system, which is configured to control which of a plurality of different modes the trailing edge system is operated in and/or how the moveable flap and the pivotable trailing edge device, and optionally the first control surface (e.g. spoiler or droop panel), are moved in use. This may be achieved using one or more inputs from one or more other flight systems and/or aircrew/pilot inputs.

The aircraft wing as described or claimed here may be a part-assembled wing, and may be in the form of only a starboard section of a wing or a port section of a wing. It will be understood that aircraft manufacture can often comprise the assembly of various sub-assemblies or parts that are made in different countries from the country in which the aircraft is finally assembled. As such the present invention has application in relation to such wings, whether or not fitted to an aircraft or in a completed state of manufacture.

According to a further aspect of the invention, there is a provided an aircraft. The aircraft may have a starboard wing and a port wing, each wing being in accordance with the wing of the present invention. The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

Such an aircraft may be configured to undergo a roll and/or banking manoeuvre by moving the pivotable trailing edge devices so that the pivotable trailing edge device on the flap of one of the starboard wing and the port wing is in an elevated position while the pivotable trailing edge device on the flap of the other of the starboard wing and the port wing is in a lowered position. It will be understood that a roll and/or banking manoeuvre occurs when the bank angle of the aircraft changes and/or when the pivotable trailing edge devices collectively provide a moment force that if not opposed would urge the aircraft to rotate about its longitudinal axis.

An embodiment of the invention concerns an aircraft having a starboard wing and a port wing, each wing comprising a trailing edge system, which optionally comprises a spoiler or droop panel mounted for pivotable movement relative to the wing, and also comprises a moveable flap comprising a pivotable trailing edge device, pivotable from an elevated position to a lowered position, there being a neutral position therebetween in which the trailing edge device forms an extension in the chordwise direction to the upper and lower surfaces of the flap and wherein the aircraft is configured to undergo a bank/roll manoeuvre by moving the pivotable trailing edge devices so that the pivotable trailing edge device on the flap of one of the starboard wing and the port wing is in the elevated position while the pivotable trailing edge device on the flap of the other of the starboard wing and the port wing is in the lowered position.

According to a yet further aspect of the invention, there is a provided a method of operating an aircraft, the aircraft being one in accordance with the present invention.

The method may include operating the aircraft in flight and moving one or more of the first control surface (e.g. spoiler or droop panel), the flap and the pivotable trailing edge device to adopt a different mode of operation of a wing of the aircraft, for example different from a normal cruise mode.

There may be applications of the method of the present invention that do not necessarily need the use of the spoiler, droop panel or the like in an operation. One such application of the method may include the steps of operating the aircraft in a normal cruise mode and operating the aircraft in a different mode of operation during which there are steps of rotating the trailing edge device on at least one of the flaps by at least 10 degrees, relative to the flap, away from the neutral position, the flap either not rotating itself or rotating by less than 5 degrees relative to the neutral position relative to the wing. In the normal cruise mode, it may be that the flap on each wing forms an extension in the chordwise direction to the upper and lower surfaces of the wing, the flap being in a neutral position, the flap also being arranged to be raised and lowered from the neutral position relative to the wing, and the trailing edge device forms an extension in the chordwise direction to the upper and lower surfaces of the flap, the trailing edge device being in a neutral position. The method may for example include rotating upwards (i.e. raising) the trailing edge device on at least one of the flaps by at least 10 degrees, relative to the flap, from the neutral position, and additionally rotating downwards (i.e. lowering) a trailing edge device on at least one of the flaps (which could be the same flap at a different time, or a different flap optionally at the same time) by rotating it by at least 10 degrees, relative to the flap, away from the neutral position (with the flap either not rotating relative to the wing or rotating by less than 5 degrees from its neutral position). Thus the raising and lowering motions of the trailing edge device could be the same trailing edge device moving during different modes of operation. Alternatively, the raising and lowering motions of a trailing edge device could be the different trailing edge devices (e.g. one on the starboard wing one on the port wing) moving at the same time. The different mode of operation may be a high speed roll control mode. The different mode of operation may be a cruise mode but operating with a different camber. The different mode of operation may be a load alleviation mode, for example being actuated automatically when it is detected that the wing is sustaining loading conditions meeting pre-set criteria (e.g. the load measured is greater than a permitted threshold)—which may happen in windy/gusting conditions and/or during certain manoeuvres. The different mode of operation may be any one of the group consisting of load alleviation mode, banking/rolling mode, low speed roll control, high speed roll control, lift dumping mode, air-braking mode, high lift mode in which the trailing edge device remains in a neutral position relative to the flap, high lift mode in which the trailing edge device is lowered from its neutral position relative to the flap, chord-reduction mode when in cruise, and camber-modified mode.

It may be that the aircraft is operated in any two of the aforementioned modes. It may be that the aircraft is operated in any three of the aforementioned modes. It may be that the aircraft is operated in any four of the aforementioned modes. It may be that the aircraft is configured to be operated in all, or all but one (or possibly all but two), of the aforementioned modes (including normal cruise mode). In embodiments, providing a unified and integrated trailing edge system that is configurable for use in multiple (and many) modes of operation adds versatility and provides the opportunity for enhanced efficiencies in operation of the aircraft, whilst keeping the design and manufacture of such a system relatively straightforward and needing no more actuator systems than might already be required for such an aircraft.

It may be that the aircraft is operated in a rolling or banking mode of operation (which may or may not be the afore-mentioned different mode of operation) in which a trailing edge device on one of the port and starboard wings is moved to its elevated position and a trailing edge device on the other of the port and starboard wings is moved to its lowered position.

It may be that the aircraft is both operated in a normal cruise mode and a chord-reduced cruise mode. In the normal cruise mode the flap on each wing forms an extension in the chordwise direction to the upper and lower surfaces of the wing. In the chord-reduced cruise mode, a flap on each wing is retracted to form less of an extension in the chordwise direction to the upper and lower surfaces of the wing, thus resulting in a wing with a reduced dimension in the chordwise direction.

An embodiment of the invention relates to a method of operating an aircraft, the aircraft having a starboard wing and a port wing and the method includes the steps of operating the aircraft in
  a normal cruise mode in which a flap on each wing forms an extension in the chordwise direction to the upper and lower surfaces of the wing, and
  a chord-reduced cruise mode in which the flap on each wing is retracted to form less of an extension in the chordwise direction to the upper and lower surfaces of the wing, thus resulting in a wing with a reduced dimension in the chordwise direction.

The flap may be one of a trailing edge according to other aspects of the invention, this including a pivotable trailing edge device as described or claimed herein.

An embodiment of the invention concerns an aircraft wing comprising a trailing edge system, which optionally comprises a spoiler or droop panel mounted for pivotable movement relative to the wing, and also comprises
- a moveable flap comprising a pivotable trailing edge device,
- the wing having a first configuration being for normal cruise mode in which the flap provides an extension to the wing in the chordwise direction, and in which the pivotable trailing edge device provides an extension to the flap in the chordwise direction the wing having a first chordwise dimension as measured at a first spanwise location,
- the wing having a second configuration in which the flap is positioned so that the wing has a second chordwise dimension as measured at the first spanwise location, the second chordwise dimension differing from the first chordwise dimension.

It may be that the value of the dimension in the chordwise direction is varied during cruise. The variation of the dimension may be controlled by a control unit. The control unit may receive one or more inputs regarding the flight conditions and processes those inputs to calculate a desired dimension in the chordwise direction. This desired dimension can then be used by, or outputted by, the control unit to control the position of the flap during cruise. The inputs regarding the flight conditions and processes may include one or more of (preferably all of) altitude, aircraft speed (target or actual) and aircraft weight. The flap may be one of a trailing edge according to other aspects of the invention, this including a pivotable trailing edge device as described or claimed herein. The control unit may also control the wing shape (e.g. changing wing camber) by means of moving the trailing edge device. The same inputs may be used to determine the desired wing shape to be achieved.

Embodiments in which the chord length can be varied in cruise can provide various advantages taking into account the weight (e.g. operating weight), altitude, speed, and/or desired performance of the aircraft. For example, in general, a reduction in chord/wing area can provide advantages at low aircraft weights and in the climb, when the lift coefficient (CL) is low. A higher wing area can provide advantages at high weights. As mentioned above, the benefits of reducing the chord during flight may be applicable not only during cruise but also during climb and/or descent.

According to a yet another aspect of the invention, there is a provided a kit of parts for use in performing a method of the present invention and/or for forming a wing according to the present invention. The kit thus comprises a flap including mounting apparatus for (or otherwise being configured to be suitable for) moveably mounting the flap to a wing. The kit also includes a pivotable trailing edge device. The pivotable trailing edge device may be mounted on the flap. If not, the pivotable trailing edge device may be configured for being so mounted on the flap. The kit may also comprise a control system, or software for a control system, being configured for controlling movement of the flap and the pivotable trailing edge device when performing the method of any aspect of the invention described or claimed herein. The control system may control aspects of the flight of the aircraft as part of a "fly by wire" system, for example automating aspects of the movement of the parts of the trailing edge system during one or more of the modes of operation. There is a provided a control system and/or software therefor independently of the kit of parts.

An embodiment of the invention may be considered as relating to an aircraft comprising a starboard wing and a port wing, wherein each wing has a trailing edge system having first, second and third control surfaces that are each moveable relative to each other. Each such control surface may be generally elongate, preferably formed by one rigid panel (but optionally multiple such rigid panels arranged in series in the spanwise direction), thus extending in a direction from root to tip of the wing and having a leading edge and a trailing edge. There may be an arrangement in which the leading edge of the second control surface extends along and next to (e.g. directly adjacent to, without any significant gap therebetween and/or without any significant overlap of the respective control surfaces) the trailing edge of the first control surface. The first control surface (e.g. a spoiler, a droop panel or the like) is configured for movement in flight to and from a lift dumping configuration. The third control surface is pivotably mounted to the second control surface at a junction between the leading edge of the third control surface and the trailing edge of the second control surface. The second control surface may function as a flap which is both moveable in the fore-aft direction and pivotable between raised (elevated) and lowered positions. The third control surface may function as a pivoting tab on the trailing edge of the second control surface. The spanwise extent of the first, second and third control surfaces may be substantially the same. The possible movements and configurations of the second control surface and the third control surface enable (a) the chord length of the wing to be varied in flight, (b) the camber of the wing to be varied in flight, and (c) a moment force on the aircraft about its longitudinal axis to be changed in flight (thus replicating the function of ailerons).

It will of course be appreciated that features described in relation to one aspect of the present invention may be incorporated into other aspects of the present invention. For example, the method of the invention may incorporate any of the features described with reference to the apparatus of the invention and vice versa. By way of further example, the features of the flap and associated pivotable trailing edge device described herein may be incorporated in relation to the above-described second and third control surfaces.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
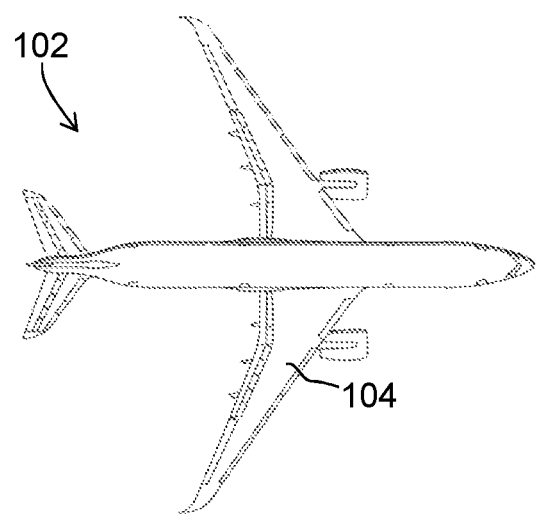
FIG. 1 shows an aircraft of the prior art.
Figure 2:
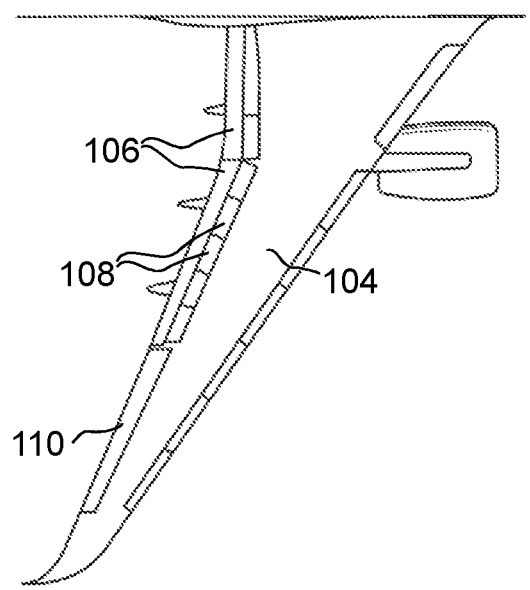
FIG. 2 shows a wing of the aircraft of FIG. 1.

An embodiment of the invention is shown in FIGS. 3 to 10. The embodiment concerns an aircraft wing comprising a trailing edge system 12. The embodiment may be applied to any fixed wing aircraft but the present embodiment is envisaged for use on a commercial passenger aircraft similar to that shown in FIG. 1. The trailing edge system 12 comprises a spoiler 8 ("lift dumper") pivotable relative to the wing 4, a flap 6 to which there is connected a trailing edge device in the form of a tab 14. Each of the spoiler 8, flap 6 and tab 14 is in the form of a rigid component, thus holding its shape when moved.

Figure 3:
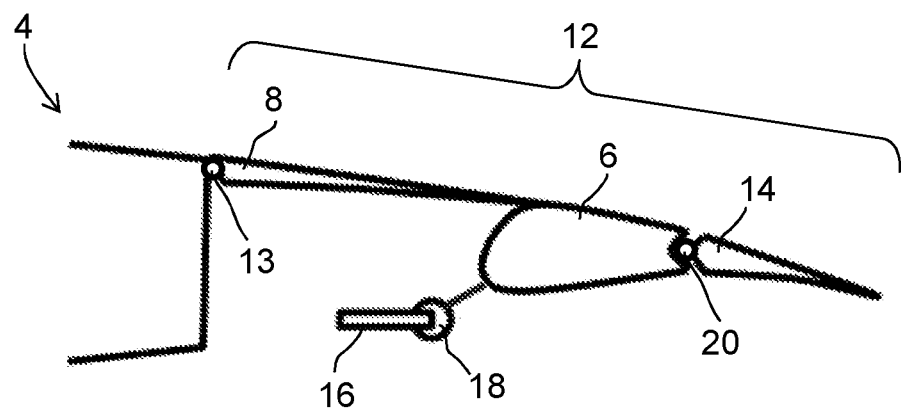
FIG. 3 is a side view of a trailing edge system of an embodiment of the invention when used in a normal cruise mode.

An actuator (not shown) is provided for rotating the spoiler 8 away from its neutral position as shown in FIG. 3 about a hinge 13 (only shown in FIG. 3). A further actuator (not shown) is provided for moving the flap 6 (together with its tab 14) along a track 16, thus allowing the flap 6 to be deployed outboard and retracted inboard. A further actuator (not shown) is provided for rotating the flap 6 (together with its tab 14) about a hinge 18. A further actuator (not shown) is provided for rotating the tab 14 relative to the flap about a hinge 20 (only shown in FIG. 3). The spoiler 8 and its actuator are configured so that the spoiler 8 may be rotated independent of movement of the flap 6. The tab 14 moves with the flap 6, when the flap 6 is moved, but the tab 14 is also moveable independently of the flap 6.

Figure 4:
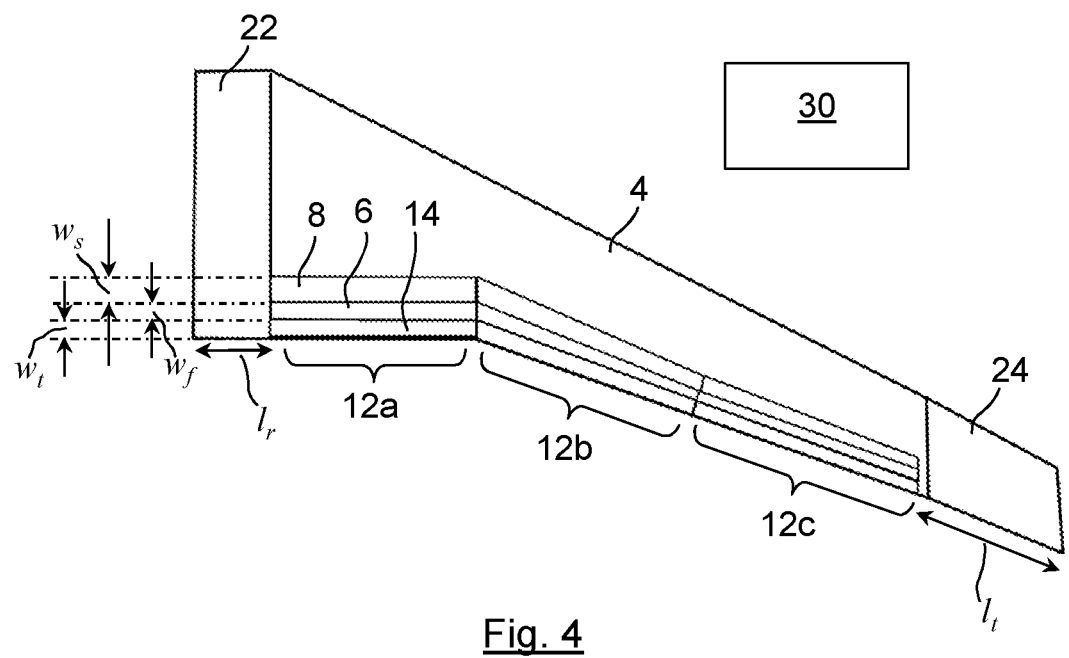
FIG. 4 is a plan view of a wing showing the trailing edge system of FIG. 3.

As shown in FIG. 4, the wing 4 has three trailing edge systems 12a, 12b, and 12c— each with a configuration broadly in accordance that shown in FIG. 3. The wing 4 has a wing root section 22 and a wingtip device 24 at its tip. The trailing edge of the wing 4 shown in FIG. 4 has a length l corresponding to the length of each trailing edge system 12a, 12b, and 12c along the trailing edge of the wing plus the distance $l_r$ between the wing root section 22 and the inboard trailing edge system 12a and the distance $l_t$ between the tip of the wing 4 and the outboard trailing edge system 12c. It will be seen that the sum of the lengths of the trailing edge systems 12a, 12b, and 12c represents about 75% of the length l or over 90% of the length of the wing (when the root section 22 and wing tip device 24 are discounted). There are no separate ailerons on the trailing edge. Thus the control surfaces on the wing, apart from the leading edge and any moveable wing tip devices, are only provided by the control surfaces provided by the three trailing edge systems. By analogy to the "flaperon"s of the prior art, the tabs 14 may be considered as being "taberon"s in that they perform the dual function of a tabbed flap and of an aileron.

With reference to the inboard trailing edge systems 12a shown in FIG. 4, the flap 6 has a width $w_f$ in the chordwise direction, the tab 14 has a width $w_t$ in the chordwise direction and the spoiler 8 has a width $w_s$ in the chordwise dimension. Each of the flap 6, tab 14 and spoiler 8 has a length (in the direction along the trailing edge—i.e. spanwise direction) at least five times its width. The control surfaces are all relatively elongate in the spanwise direction. The flap 6, the tab 14 and the spoiler 8 of each of the trailing edge systems 12a, 12b and 12c on the wing 4 are of similar spanwise length to each other. Thus the tab 14 extends for substantially the entire length of the flap 6 to which it is attached, not for just a part of it. It will be seen that the shape of the flap 6, the tab 14 and the spoiler 8 of each of the trailing edge system 12a, 12b and 12c is not necessarily perfectly rectangular. FIG. 4 is a schematic diagram. The shape of each control surface will need to take account of the overall shape of the wing 4, how the wing 4 moves in use, and the kinematics of the control surfaces.

A control unit 30 shown only in FIG. 4 and only schematically controls the actuators of the spoiler 8, flap 4 and tab 14 of each of the trailing edge systems 12a, 12b and 12c in accordance with different modes of operation. The control unit 30 may be provided in the aircraft but not wholly within the wing 4. The function of the control unit 30 may be distributed across various aircraft systems and inputs from various existing systems may be used to assist control by the control unit 30 of the trailing edge systems 12a, 12b and 12c in use.

There may be a control unit associated with the trailing edge system, which is configured to control which of a plurality of different modes the trailing edge system 12 is operated in and/or how the moveable flap 6 and the tab 14, and optionally the spoiler 8, are moved in use. This may be achieved using one or more inputs from one or more other flight systems and/or aircrew/pilot inputs.

Different modes of operation will now be described with reference to FIGS. 3 and 5 to 10.

FIG. 3 shows the spoiler 8, flap 6 and tab 14 in a neutral position suitable for use in a normal cruise mode. It will be seen that the upper surface of the wing 4 is continued/extended by the upper surfaces of the spoiler 8, the flap 6 and the tab 14, with the end of the spoiler 8 terminating at the start of the flap 6 and the end of the flap 6 terminating at the start of the tab 14 (in the chordwise direction). Substantially the entire upper surface of each of the spoiler 8, the flap 6 and the tab 14 are used to form a part of the upper surface of the wing 4 (none of the spoiler 8, flap 6 or tab 14 being stowed/retracted in this configuration).

Figure 5:
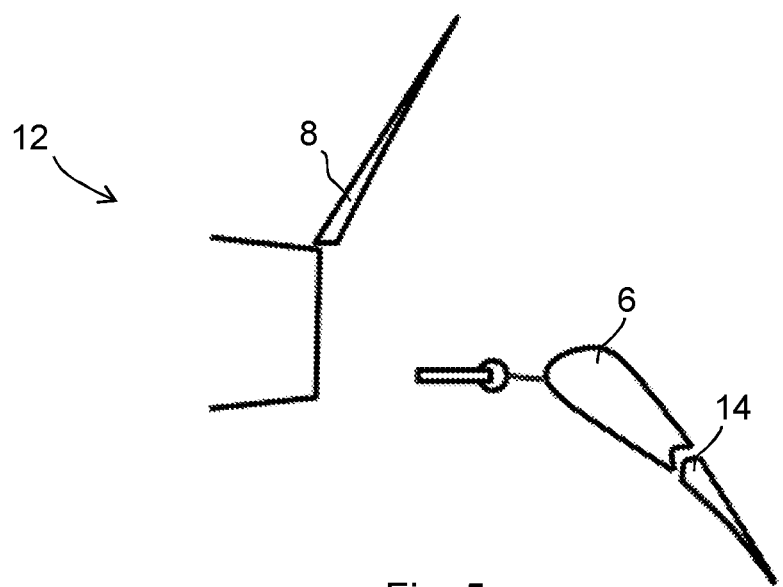
FIGS. 5 to 10 show various different modes of operation of the trailing edge system of FIG. 3.

FIG. 5 shows the trailing edge system 12 being operated in a lift dumping mode, in which the flap 6 is in a lowered position and the spoiler 8 is in an elevated position. The tab 14 provides an extension to the flap 6 in the chordwise direction.

Figure 6:
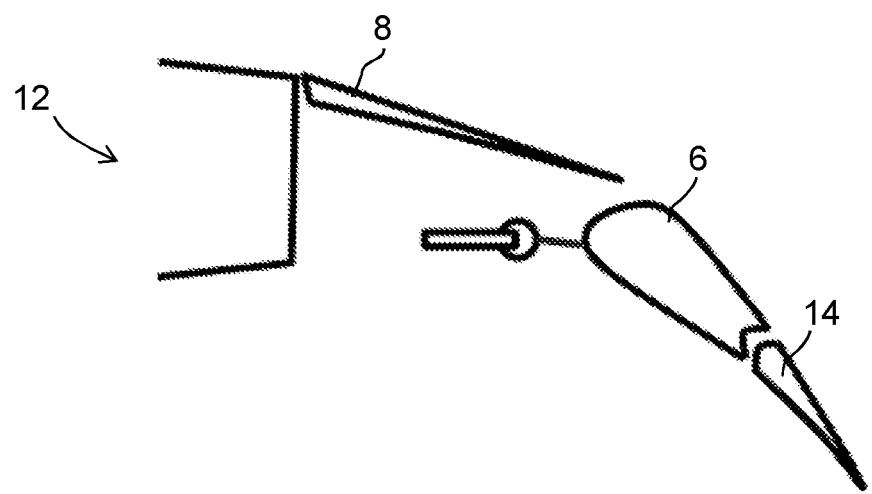

FIG. 6 shows the trailing edge system 12 being operated in a high lift mode, in which the flap 6 is moved to a lowered position by means of rotation to expose a slotted gap between the leading edge of the flap 6 and the wing 4. The tab 14 provides an extension to the flap 6 in the chordwise direction. The spoiler 8 is in a slightly lowered position as compared to its neutral position in normal cruise mode (shown in FIG. 3).

Figure 7:
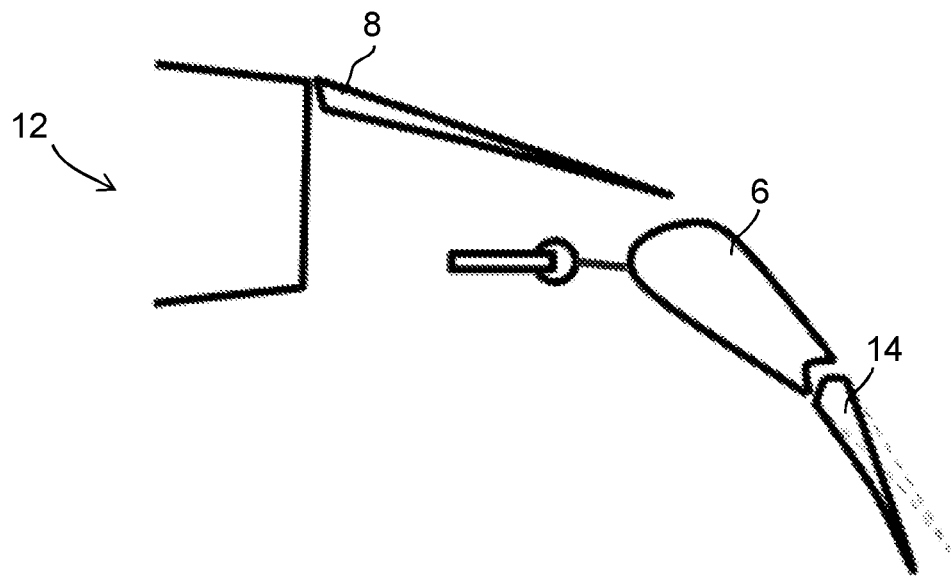

FIG. 7 shows the trailing edge system 12 being operated in an enhanced high lift mode, in which the camber of the wing 4 is increased yet further by means of lowering the tab 14 (note the position of the tab 14 in FIG. 7 relative to the broken line in FIG. 7 which corresponds to its position of the tab 14 in the high lift mode of FIG. 6).

Figure 8:
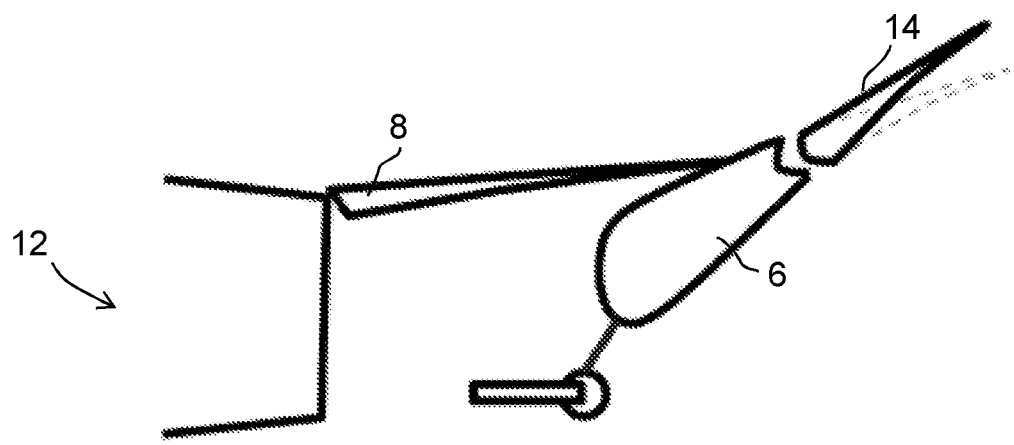

FIG. 8 shows the trailing edge system 12 being operated in a low speed roll control mode, in which the spoiler 8 is raised, the flap 6 is raised with the trailing edge of the spoiler 8 meeting the upper surface of the flap 6 at a chordwise location that is closer to the trailing edge of the flap 6 than the leading edge of the flap 6. The tab 14 is also raised as compared to its neutral position (shown in broken line in FIG. 8). The corresponding trailing edge system 12 on the other wing may have the tab 14 in a lower position thus providing a rolling/banking moment on the aircraft in flight at low speed. The tabs 14 thus function as ailerons in this mode.

Figure 9:
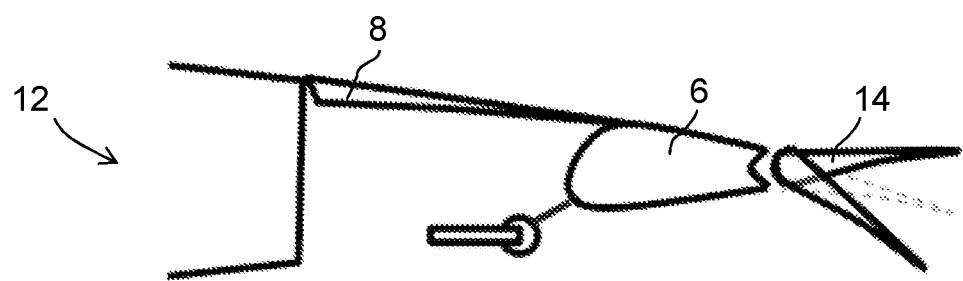

FIG. 9 shows the trailing edge system 12 being operated in a high speed mode, in which the spoiler 8 and flap 6 are in the cruise mode positions (as shown in FIG. 3), but the tab 14 is moved from its neutral position (shown in broken line in FIG. 9). FIG. 9 shows the tab 14 both in its raised position and its lowered position, the angular separation between which being about 40 degrees. A tab 14 on one wing could be lowered while the corresponding tab 14 on the other wing is raised, this performing the function of ailerons at high speed. Other high-speed modes of operation (in which just the tab 14 moves) can include modifying the camber during flight to optimise wing shape during cruise. Also the tab 14 could be quickly moved to accommodate a load alleviation function. This may require the tab 14 to move at a speed of the order of 100 degrees per second.

Figure 10:
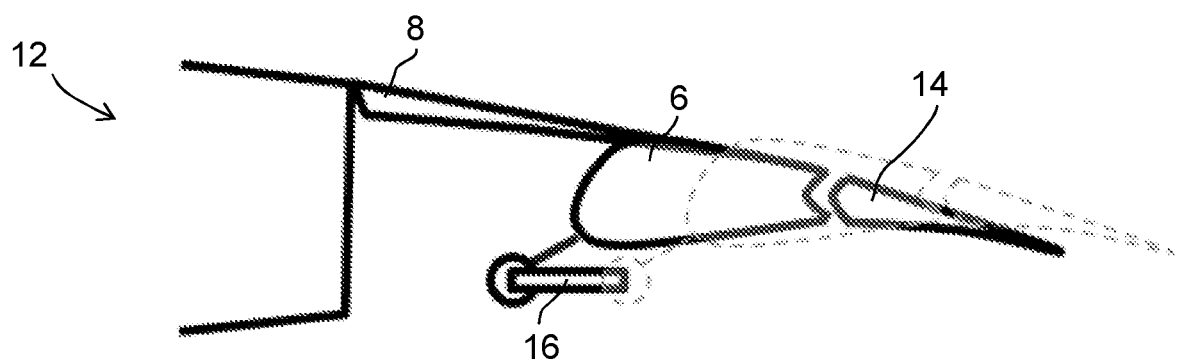

FIG. 10 shows the trailing edge system 12 being operated in a chord reduction cruise mode at high speed (with the normal cruise mode configuration of FIG. 3 being shown in broken line in FIG. 10). It will be seen that the flap 6 and tab 14 have been retracted by means of a movement along the track 16 so that the upper surface of the flap 6 at its leading edge is shielded and covered by, and partially stowed underneath, the upper surface of the spoiler 8, thus reducing the chord and effective surface area of the wing 4.

It will be appreciated that the functions of FIGS. 9 and 10 may be combined thus allowing for both camber or chord modification during (high speed) cruise mode so that the wing shape may be optimised for the operational scenario at that moment. The shape can be continuously modified during cruise by a suitably programmed control unit. The control unit would receive various inputs regarding the aircraft's operational state including altitude, current aircraft speed and aircraft weight. With such information, and optionally other data, the optimum wing shape can be calculated and set using the trailing edge system 12 of the present embodiment. For example, the wing chord length and wing area may be reduced when the aircraft weight is relatively low and/or when in the climb, when the lift coefficient (CL) is low. Increasing chord and wing area may be better at higher weights.

Figure 11:
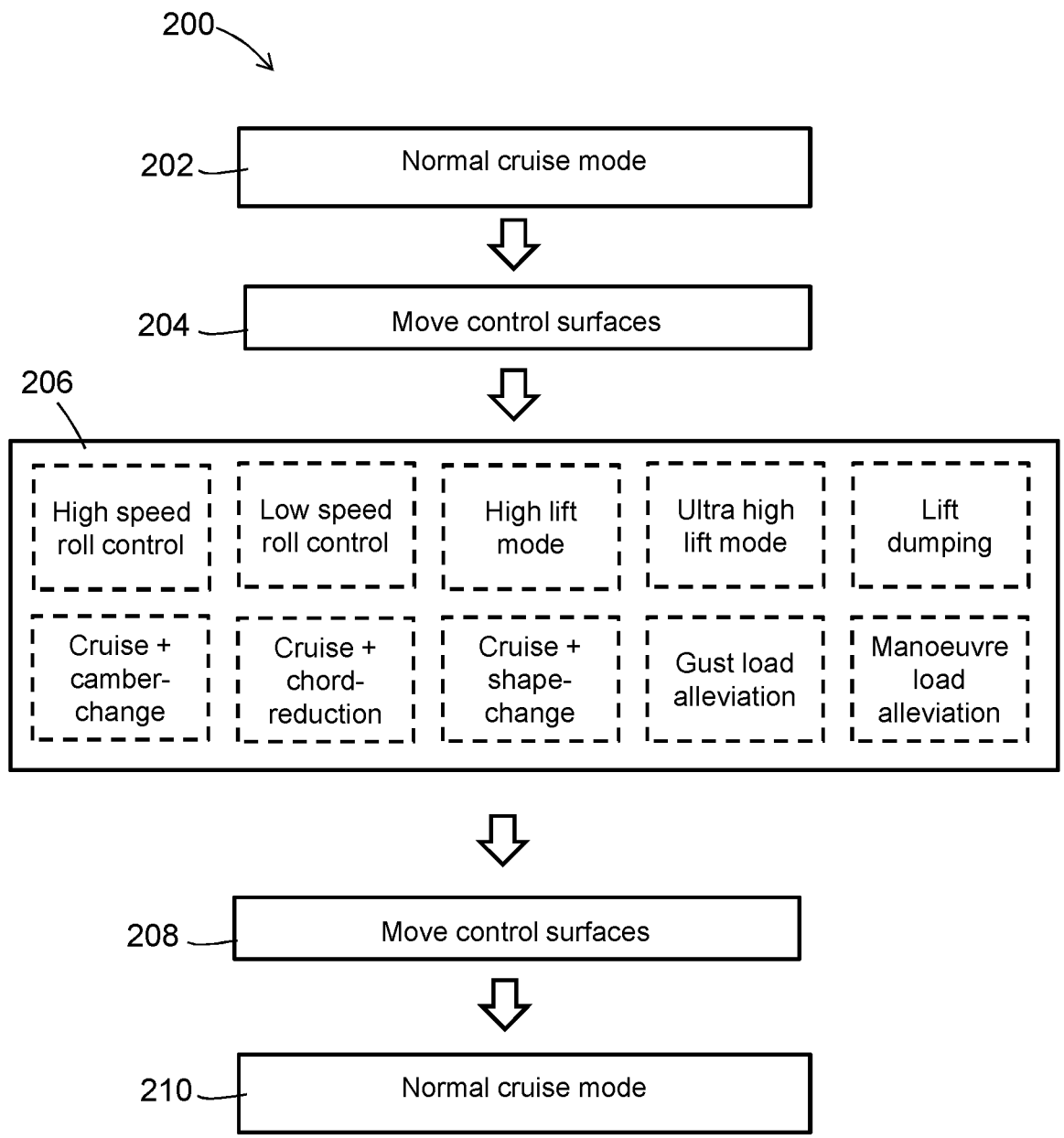
FIG. 11 is a flow chart illustrating a method in accordance with a further embodiment.

FIG. 11 shows a flowchart 200 illustrating a method of operating an aircraft according to a second embodiment of the invention, which may utilise a trailing edge system of the first embodiment. The method includes steps of operating the aircraft in a normal cruise mode (represented by boxes 202 and 210) before and/or after operating the aircraft in one or more different modes of operation (represented by box 206), during which there are steps (represented by boxes 204, 208) of rotating a trailing edge device on at least one moveable flap of the aircraft relative to the position of the rest of the flap, and/or rotating the flap and/or translating the flap (e.g. along a track) and/or moving a spoiler. The normal cruise mode corresponds to the trailing edge system configuration shown in FIG. 3. The different modes of operation shown in FIG. 11 include high speed roll control (corresponding to the configuration shown in FIG. 9), low speed roll control mode (corresponding to the configuration shown in FIG. 8), standard high lift mode (corresponding to the configuration shown in FIG. 6), enhanced high lift mode (corresponding to the configuration shown in FIG. 7), lift dumping (corresponding to the configuration shown in FIG. 5), cruise with camber-modification (for example, corresponding to the configuration shown in FIG. 9), cruise with chord-reduction (corresponding to the configurations shown in FIG. 10), cruise with shape-change (corresponding to the configuration shown in FIGS. 9 and 10), and load alleviation modes including a gust load alleviation mode and a manoeuvre load alleviation mode (for example, corresponding to the configuration shown in FIG. 9). When operating in any one of the "cruise with camber-modification", "high speed roll control", "low speed roll control", or "load alleviation" (whether "gust load alleviation" and/or "manoeuvre load alleviation") modes or transitioning between the "standard high lift mode" and the "enhanced high lift mode", the trailing edge device (e.g. the tab 14 as shown in FIGS. 3 to 10) could be rotated up to +/−20 degrees, relative to the flap 6, away from a neutral position. The flap 6 may remain stationary relative to the wing 4 while the tab 14 moves in certain modes of operation. In others, the flap 6 and tab 14 move together away from the flap 14's neutral position. The method may include transitioning between any one of the modes of operation represented in box 206 to any other such mode of operation. While the aircraft performing the method may have the capability of utilising all such modes of operation, it may be that only a sub-set of modes of actually used on a single flight of the aircraft. Other modes of operation not shown in FIG. 11 may also be possible.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The illustrated trailing edge system may have commercial life as a kit of parts—e.g. covering various non-assembled states. Such a kit of parts may comprise the flap 6, its tab 14, a spoiler 8, a control unit 30, and also mounting devices or apparatus for assembling the parts to form the illustrated systems or perform the illustrated method.

The spoiler could be replaced with a droop panel.

The modes of operation described as being effected at high speed during cruise could be performed in the climb and/or descent stages of flight.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A trailing edge system for an aircraft wing comprising:
   a first control surface, in the form of a spoiler or a droop panel, configured to be pivotable relative to the wing,
   a moveable flap comprising a pivotable trailing edge device, the flap being configured to be moveable relative to the wing independently of movement of the first control surface relative to the wing, and the pivotable trailing edge device being moveable independently of the rest of the flap,
   wherein the trailing edge system enables the wing to have a normal cruise configuration in which
      the flap is in a neutral position, in which the flap provides an extension to the wing in the chordwise direction,
      the pivotable trailing edge device is in a neutral position, in which it provides an extension to the flap in the chordwise direction, and
      the first control surface is in a neutral position, and for the wing to have an elevated configuration in which
      the flap is in an elevated position as compared to the neutral position,
      the pivotable trailing edge device is moved relative to the flap so that the pivotable trailing edge device is in an elevated position as compared to the neutral position, and
      the first control surface is in an elevated position.

2. A trailing edge system according to claim 1, wherein the moveable flap is mountable for movement between a normal cruise configuration in which the flap provides an extension to the wing in the chordwise direction, and in which the pivotable trailing edge device provides an extension to the flap in the chordwise direction, the wing having a first chordwise dimension as measured at a first spanwise location, and a further cruise configuration in which the flap is positioned so that the wing has a second chordwise dimension as measured at the first spanwise location, the second chordwise dimension differing from the first chordwise dimension.

3. A trailing edge system according to claim 1, wherein the trailing edge system enables the wing to have a lift dumping configuration in which
the flap is in a lowered position,
the pivotable trailing edge device provides an extension to the flap in the chordwise direction, and
the first control surface is in an elevated position.

4. A trailing edge system according to claim 1, wherein the trailing edge system enables the wing to have a high lift configuration in which
the flap is in a lowered position,
a slotted gap is formed between the leading edge of the flap and the wing,
the pivotable trailing edge device provides an extension to the flap in the chordwise direction.

5. A trailing edge system according to claim 1, wherein the trailing edge system enables the wing to have a normal cruise configuration in which
the flap is in a neutral position, in which the flap provides an extension to the wing in the chordwise direction,
the pivotable trailing edge device is in a neutral position, in which it provides an extension to the flap in the chordwise direction, and
the first control surface is in a neutral position, and wherein the trailing edge system enables the wing to have a lowered configuration in which
the flap is in a lowered configuration as compared to the neutral position,
the pivotable trailing edge device is moved relative to the flap so that the pivotable trailing edge device is in a lowered configuration as compared to the neutral position, and
the first control surface is in a lowered configuration.

6. A trailing edge system according to claim 1, wherein the pivotable trailing edge device is mounted for pivoting movement of at least +/−20 degrees from the neutral position.

7. A trailing edge system according to claim 1, wherein the moveable flap and the pivotable trailing edge device are mountable for pivoting movement together about a hinge.

8. A trailing edge system according to claim 1, wherein the moveable flap and the pivotable trailing edge device are mountable for movement together along a track.

9. A trailing edge system according to claim 1, wherein the moveable flap has a width $w_f$ in the chordwise direction and a length in the spanwise direction $l_f$, the pivotable trailing edge device has a width $w_t$ in the chordwise direction and a length $l_t$ in the spanwise direction, and the first control surface has a width $w_s$ in the chordwise direction and a length $l_s$ in the spanwise direction, and wherein
$l_f$ is equal to $l_t$ +/−10%,
$l_f$ is equal to $l_s$ +/−10%,
$w_f$ is equal to $w_t$ +/−50%,
$w_f$ is equal to $w_s$ +/−50%, and
$l_f > 5 \times w_f$.

10. A method of operating an aircraft comprising an aircraft wing including one more trailing edge systems having a first control surface, in the form of a spoiler or a droop panel, configured to be pivotable relative to the wing, a moveable flap comprising a pivotable trailing edge device, the flap being configured to be moveable relative to the wing independently of movement of the first control surface relative to the wing, and the pivotable trailing edge device being moveable independently of the rest of the flap,
wherein the trailing edge device is pivotable from an elevated position to a lowered position, there being a neutral position therebetween in which the trailing edge device forms an extension in the chordwise direction to the upper and lower surfaces of the flap,
the aircraft being configured to undergo a roll and/or banking manoeuvre by moving the pivotable trailing edge devices so that the pivotable trailing edge device on the flap of one of the starboard wing and the port wing is in the elevated position while the pivotable trailing edge device on the flap of the other of the starboard wing and the port wing is in the lowered position,
when in flight by moving one or more of the first control surface, the flap and the pivotable trailing edge device to adopt a different mode of operation of the wing of the aircraft,
wherein the aircraft is both operated in
a normal cruise mode in which the flap on each wing forms an extension in the chordwise direction to the upper and lower surfaces of the wing, and
a chord-reduced cruise mode in which a flap on each wing is retracted to form less of an extension in the chordwise direction to the upper and lower surfaces of the wing, thus resulting in a wing with a reduced dimension in the chordwise direction.

11. A method of operating an aircraft according to claim 10, wherein the wing comprises a length along a trailing edge, which extends from a root of the wing to a tip of the wing, and wherein each moveable flap of each trailing edge system has a length in the spanwise direction, the one or more flaps having a combined length that extends along the majority of the length of the wing along the trailing edge.

12. A method of operating an aircraft according to claim 10, wherein the trailing edge device is pivotable from an elevated position to a lowered position, there being a neutral position therebetween in which the trailing edge device forms an extension in the chordwise direction to the upper and lower surfaces of the flap and
the aircraft being configured to undergo a roll and/or banking manoeuvre by moving the pivotable trailing edge devices so that the pivotable trailing edge device on the flap of one of the starboard wing and the port wing is in the elevated position while the pivotable trailing edge device on the flap of the other of the starboard wing and the port wing is in the lowered position.

13. A method of operating an aircraft according to claim 12 when in flight by moving one or more of the first control surface, the flap and the pivotable trailing edge device to adopt a different mode of operation of a wing of the aircraft.

14. A method of operating an aircraft according to claim 10, wherein the aircraft is operated in a rolling or banking mode of operation in which a trailing edge device on one of the port and starboard wings is moved to its elevated position and a trailing edge device on the other of the port and starboard wings is moved to its lowered position.

\* \* \* \* \*